United States Patent [19]

Sakakibara et al.

[11] 3,921,751
[45] Nov. 25, 1975

[54] METHOD AND APPARATUS FOR AUTOMATICALLY MAINTAINING THE SPEED OF AN AUTOMOBILE AT A CONSTANT PRESELECTED VALUE

[75] Inventors: Naoji Sakakibara, Chiryu; Takeshi Nakane, Okazaki, both of Japan

[73] Assignee: Aisin Seiki Kabushiki Kaisha, Japan

[22] Filed: Mar. 6, 1973

[21] Appl. No.: 338,529

[30] Foreign Application Priority Data
Mar. 7, 1972   Japan.................................. 47-23305

[52] U.S. Cl. ................. 180/108; 123/102; 123/103
[51] Int. Cl.² ........................................ B60K 31/00
[58] Field of Search......... 180/108, 105; 123/103 R, 123/102

[56] References Cited
UNITED STATES PATENTS

| | | |
|---|---|---|
| 3,322,227 | 5/1967 | Thorner .............................. 180/108 |
| 3,381,771 | 5/1973 | Granger............................. 180/108 |
| 3,405,779 | 10/1968 | Johnston............................ 180/108 |
| 3,485,316 | 12/1969 | Slavin et al. ........................ 180/108 |
| 3,596,731 | 8/1971 | Fales................................... 180/108 |
| 3,727,714 | 4/1973 | Ishikawa ............................ 180/108 |
| 3,741,332 | 6/1973 | Sakakibara ........................ 180/108 |

*Primary Examiner*—Kenneth H. Betts
*Assistant Examiner*—Jack D. Rubenstein
*Attorney, Agent, or Firm*—Oblon, Fisher, Spivak, McClelland & Maier

[57] ABSTRACT

A method and apparatus for automatically maintaining the speed of an automobile constant at a preselected value utilizes a negative feedback signal within the automatic control system to limit the movement of a throttle valve of the vehicle when the throttle valve is opened by a small amount. Excessive acceleration, deceleration, speed overshoot and hunching are prevented.

12 Claims, 3 Drawing Figures

3,921,751

METHOD AND APPARATUS FOR AUTOMATICALLY MAINTAINING THE SPEED OF AN AUTOMOBILE AT A CONSTANT PRESELECTED VALUE

BACKGROUND OF THE INVENTION

1. Field of the Invention

This invention relates in general to a method and system for the speed control of automotive vehicles and more particularly to a method and system for maintaining the speed of automotive vehicles at a constant desired or preselected value regardless of differing engine loads due to road conditions, wind or the like.

2. Description of the Prior Art

In the past automatic control systems have given much consideration to the problem of stabilization by controlling the speed of of an automotive vehicle to prevent the hunching, overshoot, or undershoot in reaching a desired speed. Also in speed control systems for automotive vehicles, it was necessary to consider the prevention of any objectionable hunching in order to provide a comfortable and smooth drive feeling for both the driver and any passengers. However, in order to prevent hunching it required a slow acceleration of the automotive vehicle and a bad response thereof. Therefore, in order to effectively prevent the hunching and slow response, it has been well known to apply a negative feedback within the automatic control system to prevent the throttle valve of the vehicle from opening or closing beyond a predetermined degree relative to the desired speed thereof. In such a manner the excess acceleration or deceleration and so the hunching can be prevented.

In order to provide the above result, it is apparent that the movement of the throttle valve must be changed to a certain signal. While somewhat satisfactory, one of the problems that has arisen has been that a means for sensing the movement of the throttle valve had to be installed on a mechanical portion which led from an accelerator pedal to the throttle valve. This was disadvantageous in that the mechanical portion was highly limited in space because the link system was passed through a narrow passage and was subject to vibration of the combustion engine. Moreover, sensing means would add an additional load onto the mechanical portion thereby causing the requirement of much additional power for operating the throttle valve.

SUMMARY OF THE INVENTION

Accordingly, one object of the present invention is to provide a new and improved unique method and system for automotive speed control wherein the means for sensing the movement of the throttle valve can be installed at any portion and designed at any structure thereby avoiding a major drawback of the prior art.

Another object of the invention is to provide a new and improved unique method and system for automotive speed control wherein the hunching can be effectively prevented by applying an effective negative feedback during a small opening degree of the throttle valve.

A further object of the invention is to provide a new and improved unique method and system for automotive speed control wherein a proper feedback gain can be obtained without adjustment in accordance with a single carburetor or twin carburetor.

Briefly, in accordance with the present invention, the foregoing and other objects are in one aspect attained by the provision of controlling the movement of the throttle valve by three signals each corresponding respectively to the actual road speed of the vehicle, the desired speed thereof, and the pressure of the engine vacuum.

BRIEF DESCRIPTION OF THE DRAWINGS

Other objects and advantages will become apparent to persons skilled in the art to which the invention relates, in the course of the following description of the preferred embodiment illustrated by way of example in the accompanying drawings, in which.

DETAILED DESCRIPTION OF A PREFERRED EMBODIMENT

Figure 1:
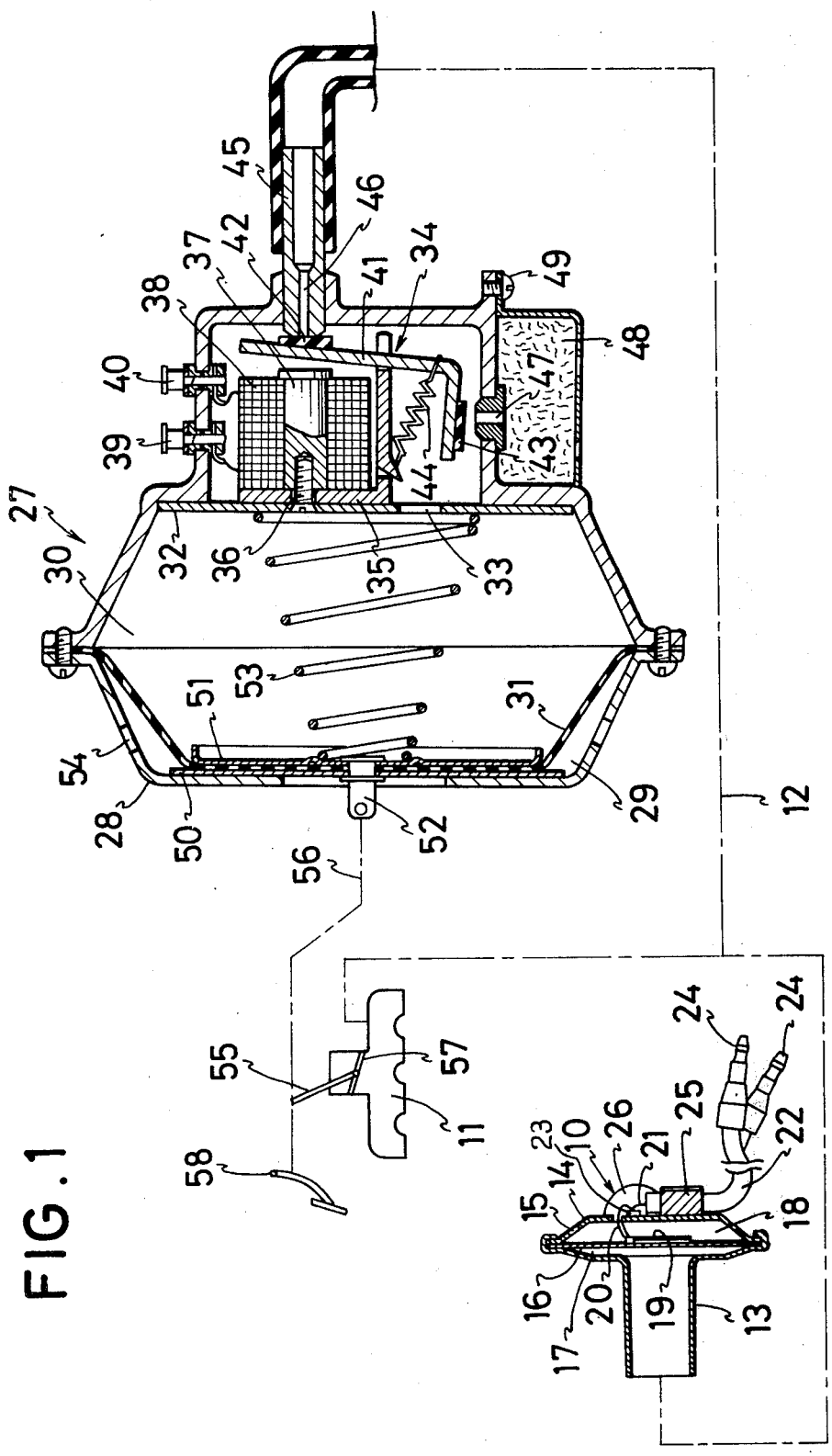
FIG. 1 is a vertical-longitudinal section of the automotive speed control embodying the principles of this invention and diagrammatically shows some parts.

Referring now to the drawings, especially FIG. 1 thereof, an engine vacuum sensor 10 is shown as being connected to an intake manifold 11 through a conduit 12 such as a rubber pipe. The vacuum sensor 10 comprises a housing 13 which is used also as a connector to the conduit 12, a cover 14 caulked to the housing 13, provided with slots 15 through which the atmospheric air can be admitted, and a pressure plate 16 fixedly provided between the housing 13 and the cover 14 whereby the interior of the vacuum sensor 10 is divided into two independent chambers, i.e., a vacuum chamber 17 and an atmospheric chamber 18. A strain-gauge 19 is fixed to the pressure plate 16 and as the pressure difference between the two chambers 17 and 18 increases the resistance of the strain-gauge 19 will increase. Lead-lines 20 of the strain-gauge 19 are connected to cores 21 of a wire 22 through an intermediate plate 23. Terminals 24 are connected to the ends of the wire 22. The wire 22 is fixed relative to the cover 14 by means of a clamping plate 25. The lead-lines 20, the cores 21 and the intermediate plate 23 are covered by a silicone rubber member 26.

A vacuum servo is indicated generally at reference 27 and comprises a housing 28 whose interior is divided into first and second chambers 29 and 30 by a diaphragm 31 secured to the housing 28 at its peripheral portion. An interior plate 32 including an air flow aperture 33 is pasted on the inside wall of the housing 28. A vacuum adjusting valve assembly 34 comprises a frame 35 fixed to the interior plate 32 by a screw bolt 36. Around the armature 37 windings 38 are wrapped. Each end of the winding 38 is connected to a terminal 39 or 40 which is made airtight so that the air in the second chamber 30 will not escape. The valve assembly 33 further comprises a valve member 41 movably attached to the frame 35 and provided with two rubber seal members 42, 43. One end of a return spring 44 engages the frame 35 while the other end thereof engages the valve member 41 to rotate in a clockwise direction in FIG. 1. When an electric current passes through the windings 38, the valve member 41 will be attracted to the armature 36. A vacuum pipe 45 is fixedly inserted into the opening of the housing 28 at one end and into the conduit 12 at the other end. The pipe 45 includes an orifice 46 whose opening end is normally closed by the seal rubber member 42. An atmospheric nozzle 47 is fixedly inserted into the other opening of the housing 28. An air cleaner 48 is fixed to the housing 28 by screws 49 so that the atmospheric air can, under normal conditions, be introduced to the second chamber 30 through the atmospheric nozzle 47, normally opened rubber seal member 43, and the aperture 33 of the interior plate 32. When the armature 37 is energized the rubber seal 43 will close the atmospheric nozzle 47. Each side of the diaphragm 31 is secured to a retainer plate 50 and a pressure plate 51 by a rivet 52. A compression coil spring 53 is provided between the pressure plate 51 and the interior plate 32 thereby normally urging the diaphragm 31 to move in the left direction in FIG. 1. It should be noted that slots 54 are provided on the housing 28 thereby normally introducing atmospheric air to the first chamber 29. The rivet 52 is mechanically connected to a throttle valve operating lever 55 through a wire means 56. When the diaphragm 31, i.e., the wire means 56 is moved to the right in FIG. 1, the throttle valve operating lever 55 will cause a throttle valve 57 to open. The throttle operating lever 55 is also mechanically connected to a foot accelerator pedal 58 in the conventional way. The structure of the intake manifold 11 and the other associated members thereof are quite conventional so that a detailed explanation thereabout will be omitted.

Figure 2:
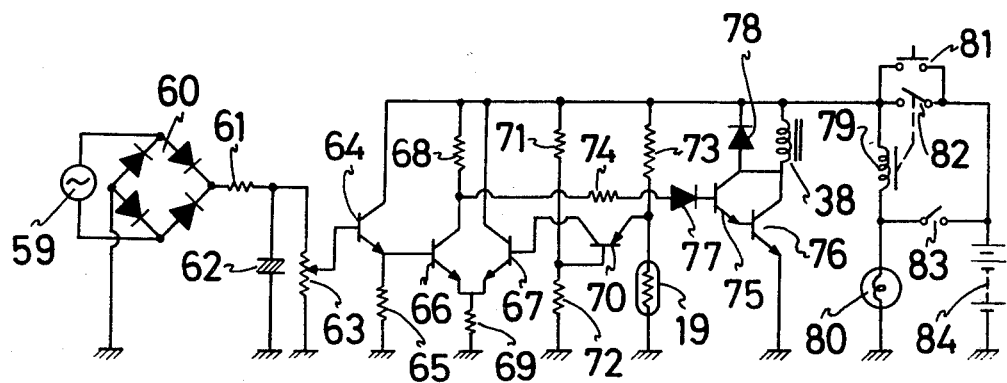
FIG. 2 shows in detail the electric circuit associated with the mechanical system shown in FIG. 1.

Now, referring to FIG. 2, a tachometer generator 59 is shown as being provided and produces an alternating current which is converted into a direct current by a diode bridge rectifier 60. A resistor 61 and a condensor 62 are provided and serve as a ripple filter. The voltage across the condensor 62 is divided by a variable resistor 63 and is applied to the base of a transistor 64. The variable resistor 63 can be manually controlled in order to set a desirable speed for the vehicle to be controlled. The numeral 65 indicates a resistor and the transistor 64 is connected in an emitter-follower connection. A first voltage signal corresponding to the desired or preselected speed thereof are applied, respectively, to each end of the resistor 65. In other words, the difference of the corresponding voltage between the actual speed and the preselected speed can be sensed across the resistor 65.

Transistors 66, 67 and resistors 68, 69 constitute a comparison means. An input voltage is applied to the base of the transistor 66 which is connected to the resistor 65, while another input voltage is applied to the base of the transistor 67, which is connected to the collector of a transistor 70. The strain-gauge 19 is connected to the emitter of transistor 70 and has a third signal voltage thereacross which corresponds to vacuum pressure produced by the throttle valve. The transistor 70 provides an error output for a bridge circuit which is constituted by resistors 71, 72, 73 and the strain-gauge 19.

A resistor 74 is connected to the collector of the transistor 66 and an input is supplied across the resistor 74 to a Darlington amplifier comprising transistors 75 and 76 through a diode 77.

The numeral 78 represents a surge absorber diode and the numeral 79 represents a relay, one end of which is connected to a brake-lamp 80 and the other ends of which is connected to a push-button switch 81 and to a normally open contact 82 for the relay 79. One end of the relay 79 is connected also to a switch 83 which is in turn connected to an automobile battery 84 and is adapted to close when the brake is applied.

In operation, the operator can set a desirable speed of the vehicle by means of the variable resistor 63 to apply a corresponding voltage on the base of the transistor 64. Then, when the push-button switch 81 is pushed an electric current flows through the relay 79 and the brake lamp 80 and thereby closes the contact 82. Even after the switch 81 is released the relay 79 will be maintained in operation.

When the actual road speed of the vehicle is slower than the desired road speed of the vehicle as set by the variable resistor 63, then the input voltage or base potential of the transistor 66 is lower than the collector potential thereof so that the transistors 75 and 76 are made conductive through the diode 77. At this time the transistor 66 is in a non-conductive state. Therefore, the windings 38 of the vacuum adjusting valve assembly 34 are energized to attract the valve member 41 to the armature 37 whereby the atmospheric nozzle 47 is closed by the rubber seal member 43, while the vacuum pipe 45 is opened. The vacuum thus introduced to the second chamber 30 from the intake manifold 11 via the conduit 12 will cause the diaphragm 31 to move in the right direction (FIG. 1) against the biasing force of the spring 53. Thus, the throttle valve 57 is opened through the wire means 56 and the throttle valve operating lever 55 so that the engine output will be increased. Consequently the vehicle is accelerated to approach the desired road speed. However, it should be noted that when the throttle valve 57 is opened the vacuum pressure produced by the throttle valve 57 is decreased. Therefore, the pressure difference sensed by the pressure plate 16 of the engine vacuum sensor 10 is decreased to reduce the resistance of the strain-gauge 19 whereby the transistor 70 will approach its non-conductive state and the transistor 66 will approach its conductive state. At this time the actual road speed of the vehicle will become higher and sufficiently increase the input voltage of the transistor 66 to cause it to turn conductive, while the transistors 75 and 76 will be turned non-conductive. Thus, the valve member 41 of the assembly 34 is returned to its original position as shown in FIG. 1 so that the atmospheric pressure is admitted to the second chamber 30 whilst the vacuum nozzle 45 is closed by the rubber seal member 42. As seen, according to the invention, when the throttle valve 57 is opened to decrease the vacuum pressure of the throttle valve 57, then the same is apt to be closed even if the actual road speed is below the desired or preselected speed of the vehicle. Therefore, the throttle valve 57 is controlled to not open too much.

On the contrary, when the actual road speed of the vehicle is higher than the command or desired preselected speed thereof, then the base potential of the transistor 66 is increased to make the transistor 66 turn on. Therefore, the transistors 75 and 76 are made non-conductive so that the vacuum adjusting valve assembly 34 is inoperative and the atmospheric pressure is introduced into the second chamber 30 of the vacuum servo 27. The throttle valve 57 is thus caused to tend to close thereby increasing the vacuum pressure thereof. The resistance of the strain-gauge 19 is increased in accordance with the increase of the vacuum pressure so that the transistor 70 approaches its conductive state. Accordingly, the transistor 66 approaches its non-conductive state while the transistors 75 and 76 approach their conductive state. Therefore, the vacuum adjusting valve assembly 34 is actuated to prevent the throttle valve 57 from closing too much.

It will be apparent from the description above that according to the invention any over or excessive opening or closing of the throttle valve 57 can be limited near to the preselected road speed of the vehicle whereby hunching or overshooting is substantially prevented.

When the driver wants to release the automatic speed control of the vehicle, he will depress the foot brake pedal, not shown, so that the electric current to the relay 79 will be turned off simultaneously with lighting of the brake lamp 80. The contact 82 is thus opened whereby the electric current flowing to the windings 38 is discontinued. Therefore the valve assembly 34 is made ineffective so that the atmospheric pressure now introduced to the second chamber 30 will act to close the throttle valve 57.

Figure 3:
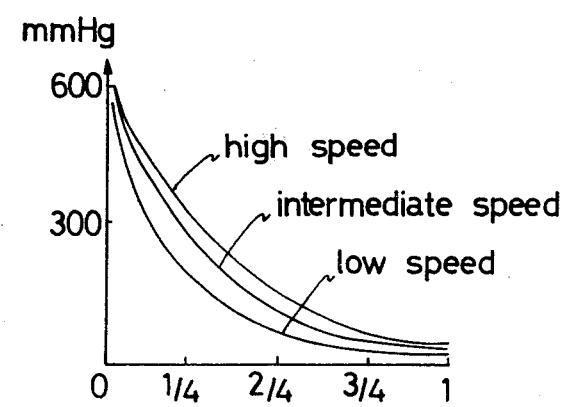
FIG. 3 is a well known diagram showing the relationship between the opening degree of the throttle valve and the pressure of the engine vacuum.

Referring to FIG. 3, it will be seen that for smaller opening degrees of the throttle valve 57 a greater change of the pressure of the engine vacuum will occur, whilst for larger opening degrees of the throttle valve 57, lesser change of the pressure of the engine vacuum will occur. It should be further noted that the hunching is more likely to occur when the throttle valve is less opened because the engine output has a more sufficient power. With this invention in accordance with that signal, of the three signals which control the throttle valve, namely that signal which corresponds to the pressure of the engine vacuum, a sufficient feedback can be applied to prevent the hunching during the small opening degree of the throttle valve.

When the throttle valve has been more opened to get a high speed of the vehicle, it is not necessary to apply as great a feedback because at a high speed the engine output does not have as much power and more air resistance is applied than at a low speed. Thus, at a high speed the throttle valve has to be opened much more than at a low speed even if the speed difference between the vehicle actual road speed and the command speed is the same as at the low speed.

Additionally, the method and system of this invention are well applicable to the automotive vehicle having a twin-carburetor as well as that having a single-carburetor. In the case of a twin-carburetor the opening degree of each throttle valve is approximately half of that in the case of a single-carbureter in order to get the same corresponding speed. This means that the twin-carburetor must have more feedback gain than the single-carburetor when the opening degree of the throttle valve has to be changed to the feedback signal. It has been very troublesome in the past to adjust the feedback gain according to the single-carburetor vehicle or twin-carburetor vehicle. However, according to this invention wherein the pressure of the engine vacuum to be changed is substantially the same in the twin-carburetor as in the single-carburetor because two throttle valves are opened in the twin-carburetor the feedback gain does not have to be changed according to the single-carburetor vehicle or twin-carburetor vehicle.

Obviously, numerous modifications and variations of the present invention are possible in light of the above teachings. It is therefore understood that within the scope of the appended claims, the invention may be practiced otherwise than as specifically described herein.

What is claimed as new and desired to be secured by Letters Patent of the United States is:

1. A speed control system for an automotive vehicle having throttle valve means, comprising:
    first means for generating a first signal corresponding to the actual automotive speed,
    second means for generating a second signal corresponding to the desired automotive speed,
    third means comprising a strain gauge engine vacuum sensor for generating a force due to a pneumatic pressure difference which is caused by the change of opening of the throttle valve means for generating a negative feedback signal corresponding to the automotive engine vacuum pressure produced by the throttle valve means, said negative feed back signal varying inversely with the opening of the throttle valve means, and
    fourth means for combining said first, second and negative feedback signals to form an error signal to control the opening of the throttle valve means.

2. A speed control system according to claim 1 wherein said fourth means includes means to limit movement of said throttle valve means for small opening of said throttle valve means.

3. A speed control system according to claim 1 wherein said fourth means further includes a vacuum servo comprising:
    a vacuum servo housing;
    a diaphragm fixed to said housing at a periphery thereof, dividing an interior of said housing into a first chamber and a second chamber, said first chamber having an atmospheric nozzle;
    means connecting said diaphragm to said throttle valve means; and
    vacuum adjusting valve means for controlling a pressure in said second chamber whereby said diaphragm connected to said throttle valve means is controlled.

4. A speed control system according to claim 3 wherein said vacuum adjusting valve means includes:
    a frame,
    an internal plate of said vacuum servo housing fixed to said frame, said internal plate having an air flow aperture therein;
    an armature fixed to said frame and surrounded by an electric coil;
    a valve member movably attached to said frame and communicating with an atmospheric nozzle and a vacuum nozzle, said valve member covering only said atmospheric nozzle when said coil is energized, and covering only said vacuum nozzle when said coil is deenergized.

5. A speed control system for an automotice vehicle having throttle valve means, comprising:
    first means for generating a first signal corresponding to the actual automotive speed,
    second means for generating a second signal corresponding to the desired automotive speed,
    third means for generating a negative feedback signal corresponding to the automotive engine vacuum pressure produced by the throttle valve means, said negative feedback signal varying inversely with the opening of the throttle valve means, and fourth means for combining said first, second and negative feedback signals to form an error signal to control the opening of the throttle valve means, said first means includes a tachometer means which develops an electrical signal proportional to an actual speed of said vehicle, said second means includes a potentiometer electrically connected to said tachometer means; and said third means includes a strain gauge communicating with a vacuum of said engine.

6. A speed control system according to claim 5 wherein said fourth means further includes electronic circuit means for combining said tachometer signal representing an actual speed, said potentiometer signal representing a preselected speed and a signal from said strain gauge representing an engine vacuum pressure to provide said error signal.

7. A speed control system according to claim 6 wherein said throttle valve means is controlled by a vacuum servo having said error signal applied thereto.

8. A speed control system according to claim 7 wherein said electronic circuit means includes a differential amplifier for combining said first, second and negative feedback signals.

9. A speed control method for an automotive vehicle having throttle valve means, comprising the steps of:
generating a first signal corresponding to the actual automotive speed,
generating a second signal corresponding to the desired automotive speed,
generating through the use of a strain gauge engine vaccuum sensor which generates a force due to a pneumatic pressure difference caused by the change of opening of the throttle valve means a negative feedback signal corresponding to the automotive engine vacuum pressure,
generating an error signal by combining said first, second and negative feedback signals, and
controlling the opening and closing movement of the throttle valve means according to said error signal.

10. A speed control method according to claim 9 wherein the step of combining said signals further includes applying said negative feedback signal to limit movement of said throttle valve means when said means is opened by a small amount.

11. A speed control method according to claim 9 wherein the step of controlling the opening and closing of said throttle valve means further includes the step of limiting a movement of said throttle valve means when said means is opened by a small amount.

12. A speed control system for an automotice vehicle having throttle valve means, comprising:
first means for generating a first signal corresponding to the actual automotive speed,
second means for generating a second signal corresponding to the desired automotive speed,
third means for generating a negative feedback signal corresponding to the automotive engine vacuum pressure produced by the throttle valve means, said negative feedback signal varying inversely with the opening of the throttle valve means, and
fourth means for combining said first, second and negative feedback signals to form an error signal to control the opening of the throttle valve means,
said third means including an engine vacuum sensor comprising:
a vacuum sensor housing;
a cover connected to said housing,
a pressure plate fixedly provided between said housing and said cover providing a vacuum chamber and an atmospheric chamber therein, and
strain sensing means fixed to said pressure plate for detecting a pressure difference between said chambers, said difference corresponding to a pressure of said engine vacuum.

* * * * *